United States Patent [19]

Fillios

[11] Patent Number: 4,655,174

[45] Date of Patent: Apr. 7, 1987

[54] HOT LIQUID GENERATOR WITH CONDENSATION AND INSTALLATION INCORPORATING THIS GENERATOR

[76] Inventor: Jean P. R. Fillios, 49, Rue Pereire, 78100 Saint Germain-en-Laye, France

[21] Appl. No.: 819,617

[22] Filed: Jan. 17, 1986

Related U.S. Application Data

[63] Continuation-in-part of Ser. No. 543,146, Oct. 18, 1983, abandoned, which is a continuation-in-part of Ser. No. 317,491, Nov. 2, 1981, abandoned, which is a continuation of Ser. No. 144,279, Apr. 28, 1980, abandoned.

[30] Foreign Application Priority Data

| Apr. 26, 1979 | [FR] | France | 79 10656 |
| Jun. 25, 1979 | [FR] | France | 79 16196 |
| Oct. 25, 1979 | [FR] | France | 79 26525 |
| Nov. 30, 1979 | [FR] | France | 79 29518 |

[51] Int. Cl.[4] .................. F22B 21/26; F22B 21/28
[52] U.S. Cl. .................. 122/261; 122/134; 165/139; 165/164; 165/170
[58] Field of Search .............. 165/139, 146, 147, 164, 165/165, 166, 167, 170; 122/134, 261, 260

[56] References Cited

U.S. PATENT DOCUMENTS

| 1,430,924 | 10/1922 | Olson | 122/261 |
| 1,556,189 | 10/1925 | Wilson | 122/261 |
| 2,129,300 | 9/1938 | Bichowsky | 165/163 |
| 4,203,392 | 5/1980 | McLane | 122/134 X |
| 4,261,299 | 4/1981 | Marran | 122/261 X |

Primary Examiner—Albert W. Davis, Jr.
Assistant Examiner—Randolph A. Smith
Attorney, Agent, or Firm—Laubscher & Laubscher

[57] ABSTRACT

A hot fluid generator is disclosed for exchanging heat between a first fluid having a first temperature and a second fluid having a second temperature. The generator includes at least two spaced parallel metal sheets spirally wound with spaced turns about a vertical central axis and joined at their top and bottom edges to define a hollow spiral wall. Upper and lower closure members arranged normal to the central axis are connected with opposite ends of the spiral wall to define a first spiral passage between successive spaced turns through which a first fluid is circulated and a second spiral passage between the spaced sheets through which a second fluid is circulated, and a central combustion chamber. A burner is centrally arranged within the combustion chamber to heat the chamber and the first fluid so that as the first and second fluids are circulated, heat is exchanged between the first and second fluids. A drain opening is provided in the lower closure member to remove condensed fluid from the first passage. In a preferred embodiment, the first fluid comprises a gaseous medium which is circulated from the central combustion chamber to an outer circumferential outlet and the second fluid comprises a liquid such as water which is introduced into the first spiral passage at the outermost portion of the spiral wall and is circulated inwardly to the center of the exchanger, whereby the gas and liquid are circulated adjacent one another in opposite directions.

5 Claims, 18 Drawing Figures

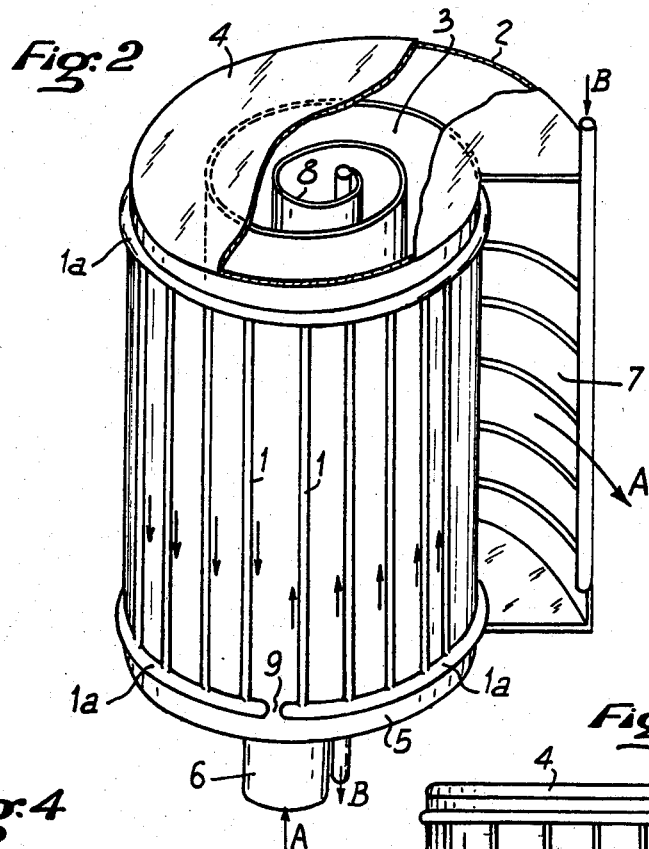
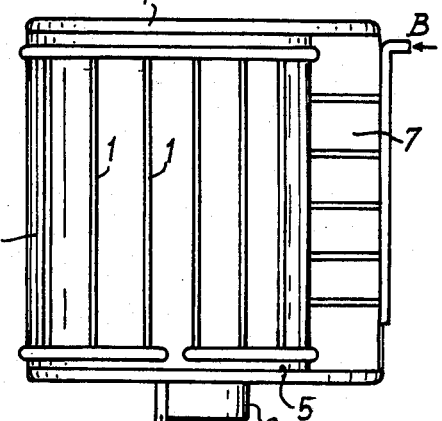
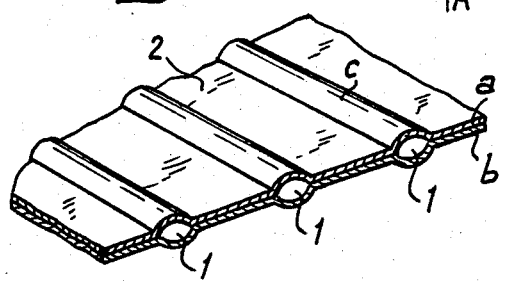
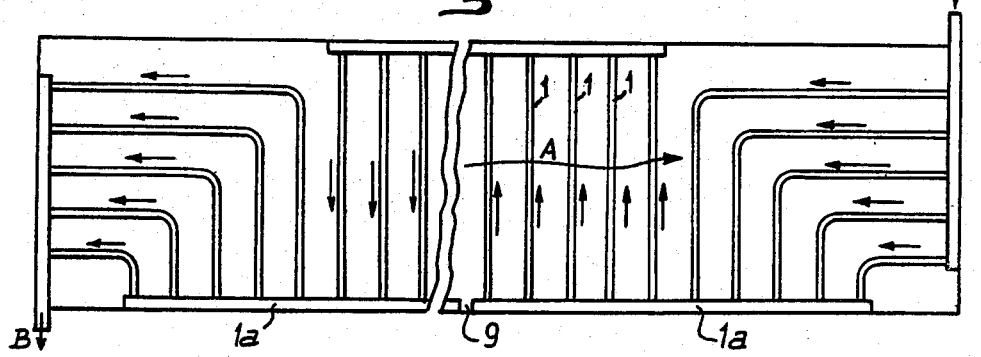

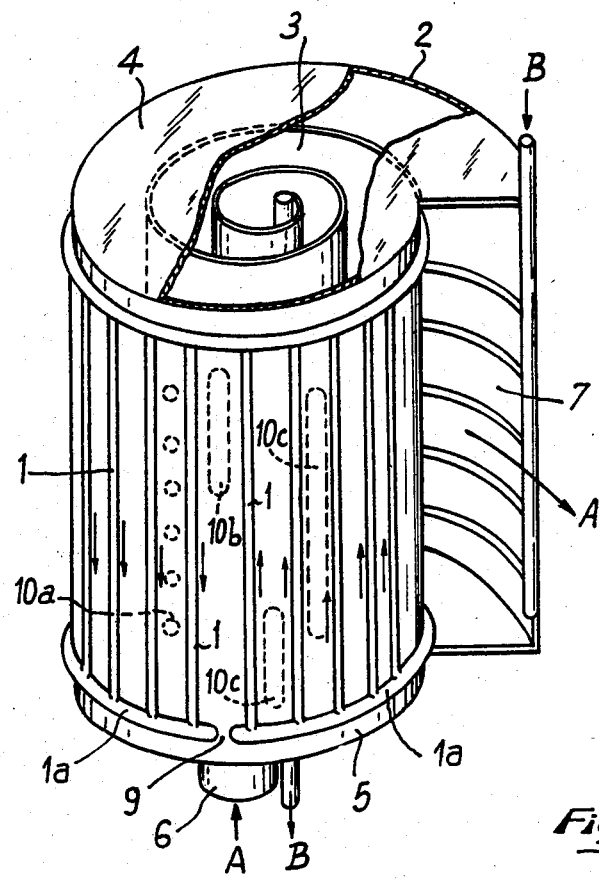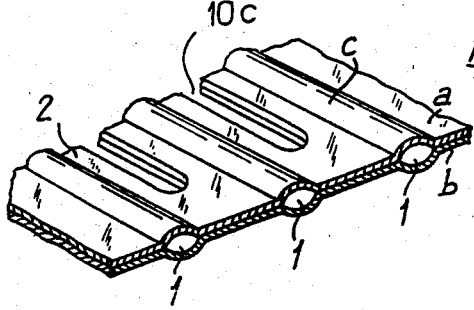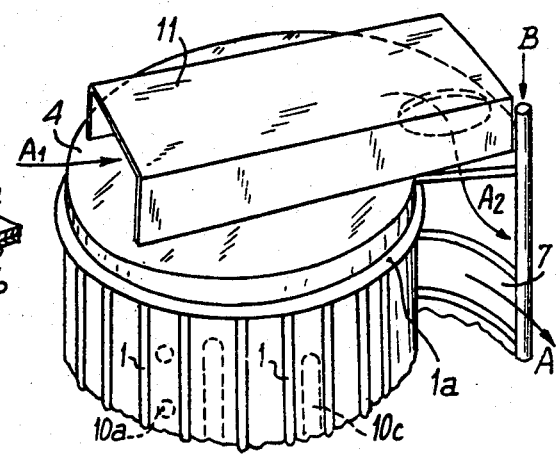

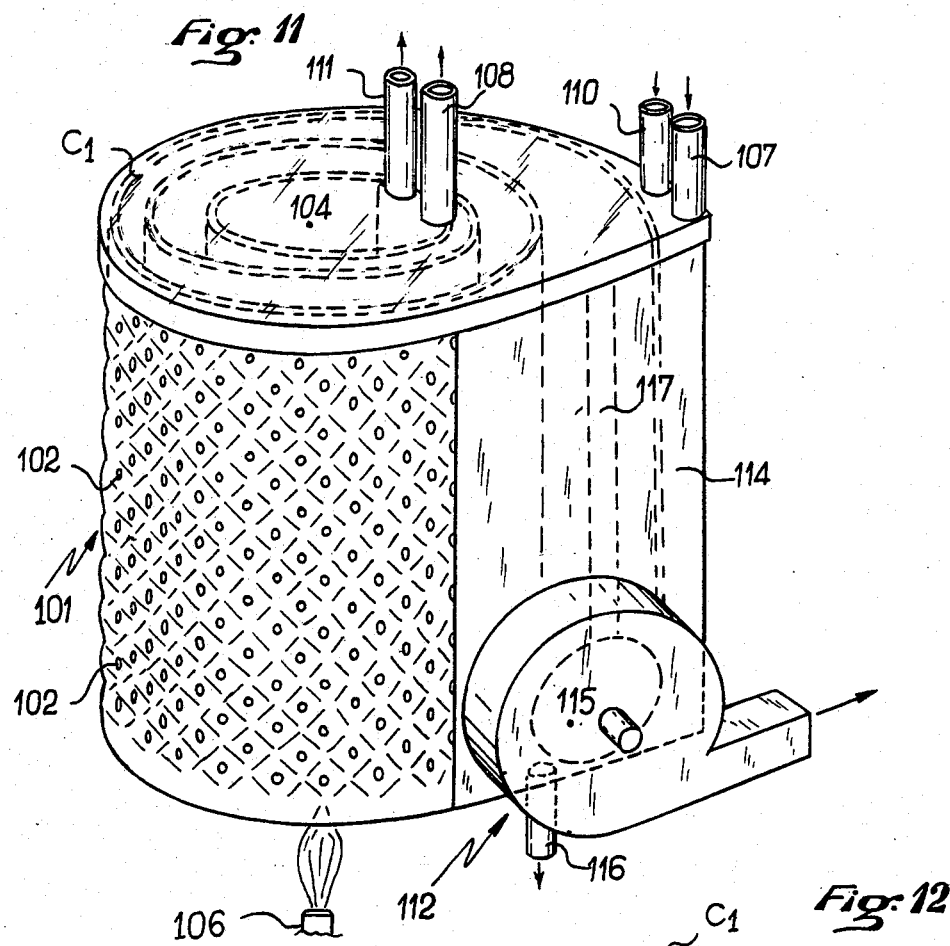
Fig. 11
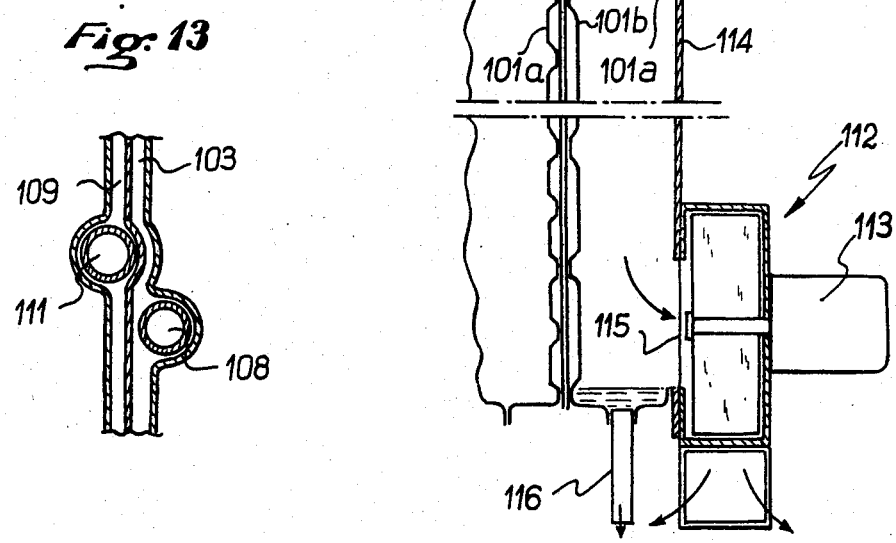
Fig. 13
Fig. 12

HOT LIQUID GENERATOR WITH CONDENSATION AND INSTALLATION INCORPORATING THIS GENERATOR

This application is a continuation-in-part of application Ser. No. 543,146 filed Oct. 18, 1983 which is a continuation-in-part of application Ser. No. 317,491 filed Nov. 2, 1981, which was a continuation of application Ser. No. 144,279 filed Apr. 28, 1980. All of the prior applications are now abandoned.

BRIEF DESCRIPTION OF THE PRIOR ART

The present invention relates to a hot fluid generator of the heat exchanger type used to achieve heat transfer between at least two circulating fluids having different temperatures which are prevented from coming into contact with each other. Such heat exchangers are well known in the art and generally comprise at least two envelopes separated by a common wall. The fluids are circulated through the respective envelopes and heat exchange is achieved through the common wall. In their most common form, heat exchangers of this type comprise a network of pipes comprising a first enclosure through which one of the fluids is circulated, and this network is inserted into a second enclosure through which the remaining fluids are circulated. Thus a large heat exchange surface area is provided which may be augmented by the addition of further internal or external wall elements such as vanes, fins, or ribs which are arranged perpendicularly to the axis of the network of pipes.

Other heat exchangers are known in the art wherein the networks of parallel pipes form a plurality of layers which are wound in a spiral configuration and placed within an enclosure as evidenced by the patents to Wilson U.S. Pat. No. 1,556,189, Bichowsky U.S. Pat. No. No. 2,129,300, and Schnitzer et al U.S. Pat. No. 3,921,713. Furthermore, heat exchangers are known wherein two fluids circulate through paths in a spiral pattern parallel to each other due to a spiral conduit placed within an enclosure.

While the aforementioned known heat exchangers normally operate quite satisfactorily, they are intended for heat exchange only between two fluids and are thus not suitable for use with heat exchange between more than two fluids.

Furthermore, in order to operate most efficiently, the prior heat exchangers necessarily include a plurality of the aformentioned vanes or ribs which increase the complexity and therefore the cost of construction of the heat exchanger.

The present invention was developed in order to overcome the aforementioned disadvantages and to provide a hot liquid generator having a spirally wound wall member defining first and second spiral passages and which can be manufactured at a greatly reduced cost. The generator affords a higher degree of heat exchange between a first fluid which is circulated through a first spiral passage and a second fluid which is circulated through a second spiral passage.

SUMMARY OF THE INVENTION

Accordingly, it is a primary object of the present invention to provide a hot fluid generator for the exchange of heat between first and second fluids having first and second temperatures, respectively, including at least two spaced parallel metal sheets spirally wound with spaced turns about a vertical central axis and joined at their top and bottom edges to define a hollow spiral wall. Continuous planar end closure members cooperate with the upper and lower end edges of the spiral wall to define a first spiral passage between successive spaced turns, a second spiral passage between the spaced sheets, and a central combustion chamber communicating with the first spiral passage. A burner is centrally arranged within the combustion chamber to heat the same. Apparatus is provided for circulating the first and second fluids, respectively. A drain device is provided for removing condensed fluid from the first spiral passage.

According to a further object of the invention, the first fluid comprises a gaseous medium and the second fluid comprises a liquid such as water.

According to another object of the invention, the first and second fluids are circulated by an aspirator arranged adjacent the bottom of the exchanger adjacent the drain device.

It is another object of the invention to provide an internal centrally arranged burner which includes a plurality of heating elements axially arranged within the chamber.

BRIEF DESCRIPTION OF THE FIGURES

Other objects and advantages of the invention will become apparent from a study of the following specification when viewed in the light of the accompanying drawing, in which:

FIG. 1 is a front plan view of a first embodiment of the hot fluid generator;

FIG. 2 is a perspective view of the generator of FIG. 1;

FIG. 3 is a front plan view of the wall member of the generator before it is wound into a spiral configuration;

FIG. 4 is a perspective sectional view of a portion of the wall member;

FIG. 5 is a perspective view of a second embodiment of the hot fluid generator;

FIG. 6 is a perspective sectional view of a portion of the wall member of the generator of FIG. 5;

FIG. 7 is a perspective view of an alternative configuration of the top portion of a hot fluid generator;

FIG. 9 is a perspective sectional view of the wall member of the hot fluid generator of FIG. 8a;

FIG. 10 is a cross-sectional view of a further embodiment of the wall member of FIG. 8a;

FIG. 11 is a perspective view of a fourth embodiment of the hot fluid generator;

FIG. 12 is a partial sectional view of the hot fluid generator of FIG. 11;

FIG. 13 is a partial horizontal sectional view of the wall member of the hot fluid generator of FIG. 11;

DETAILED DESCRIPTION

Figure 8A:
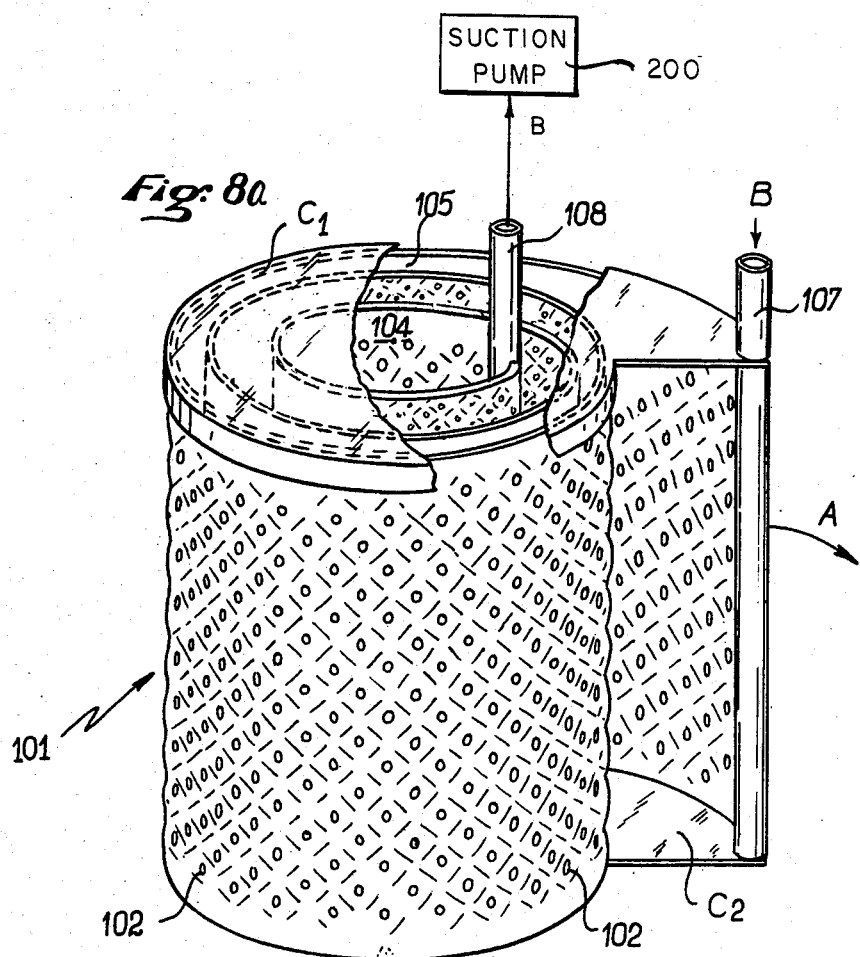
FIG. 8a is a perspective view of a third embodiment of the hot fluid generator.

Referring first more particularly to FIGS. 1 and 2, a hot fluid generator is shown for the exchange of heat between a first fluid A and a second fluid B, the direction of circulation of the fluids being illustrated by the arrows. The hot fluid generator comprises a wall member 2 spirally wound about a central axis and including a plurality of pipes 1 for the circulation of the second fluid B. A pair of lid member 4, 5 are arranged normal to the central axis and connected with the upper and lower edges of the spiral wall member to close the generator. The spirally wound wall defines a spiral chamber 3 within the generator. An inlet opening 6 is provided at the bottom of the generator for delivering the first fluid A to the central portion of the generator adjacent the innermost revolution 8 of the wall member 2. An outlet opening 7 is provided adjacent the outermost revolution of the spiral wall.

As shown more particularly in FIG. 4, the wall member 2 of the hot fluid generator comprises two sheets of sheet metal a, b which are partially welded together. The unwelded portions of the sheet metal are inflated, such as by supplying hydraulic pressure thereto to form a tubular region c which defines a pipe or passage 2 contiguously arranged with the wall member 2. A plurality of the pipes 1 are provided to define a network for flow of the fluid B. As shown in FIG. 2, the pipes are connected at their generatrices with the spiral wall member 2. Such a wall member is suitable also for use in the evaporation of a refrigerator or freezer.

The flow of the second fluid B through the passages 1 of the wall member 2 is shown more clearly in FIG. 3 which is a plan view of the wall member 2 in an unwound condition. The second fluid B enters the network of pipes 1 and is directed to upper and lower collectors 1a. Interruptions 9 in the network of pipes 1 insure that the fluid is evenly distributed over the surface area of the wall member 2 (as shown by the direction of the fluid-indicating arrows) for greater efficiency of heat exchange over the entire area of the wall. When the wall member 2 is wound into the spiral configuration of FIG. 2, the second fluid B is introduced into the network of passages 1 adjacent the outermost revolution of the wall member and removed from the network of passages 1 of the hot fluid generator adjacent the innermost revolution 8 of the wall member 2.

In operation of the hot fluid generator of FIGS. 1-4, the first fluid A preferably comprises a gaseous medium such as combustion gases which are circulated through the generator by a blower (not shown) and the second fluid B comprises a liquid medium such as water for a heating system which is circulated through the generator by a pump (not shown). The gaseous medium is introduced into the inlet 6 to the central portion of the chamber and is circulated through the spiral chamber 3 to the outlet 7. The liquid B is introduced into the network of pipes 1 at the outermost revolution of the wall member and flows opposite the direction of flow of the gaseous fluid A. As the fluids A and B circulate adjacent each other in opposite directions, the gases are progressively cooled as they circulate from the central portion of the chamber to the outlet 7, whereas the liquid is progressively heated as it flows through the network of pipes 1 from the outer portion of the generator to the inner portion thereof.

In order to further increase the efficiency of the generator, the spacing between successive revolutions of the wall member is progressively decreased, whereby the exchange of heat is gradually increased as the temperature of the gaseous fluid A decreases.

The configuration of the network of pipes 1 shown in FIG. 3 results in a more even distribution in the flow of the fluid B through the network of pipes 1 and, consequently, one can simultaneously achieve a large heat exchange surface and a considerable velocity of circulation of fluid through the pipes resulting in an increased heat exchange coefficient. In this manner, a high performance exchanger is achieved which further enables the dew point of the gaseous fumes to be attained resulting in condensation of the gaseous medium.

While the hot fluid generator illustrated in FIGS. 1-4 exhibits greater heat exchange than prior devices, the efficiency of the exchanger may be further increased by providing a plurality of discontinuities such as channels 10a, 10b, and 10c in the surface of the wall member 2 as shown in FIGS. 5, 6, and 7. The channels generally have an elongated configuration and may be of varying length as shown in FIG. 5. Preferably, the channels 10a, 10b, and 10c exist only on certain revolutions of the wall members. The lead edges of the channels disrupt the smooth surface of the wall members to create turbulence of the gaseous medium A flowing through the chamber 3. The resulting turbulence, which may take the form of eddy currents, increases the heat exchange from the gaseous medium to further increase the efficiency of the exchanger. Furthermore, the channels considerably reduce the charge losses which normally result from circulation of the fluid A in a spiral state.

The discontinuities in the wall surface may also comprise apertures or protrusions or a combination of the two and are preferably provided only on the wall surfaces which do not define the outer wall of the generator.

A device for drying the combustion gas leaving the hot fluid generator through the outlet 7 is shown schematically in FIG. 7. On the upper lid 4 is mounted a U-shaped element 11. A drying gaseous fluid is introduced into the element 11 at $A_1$ and exits the element at $A_2$ where it is mixed with the gaseous fluid A to dry the same.

Figure 9:
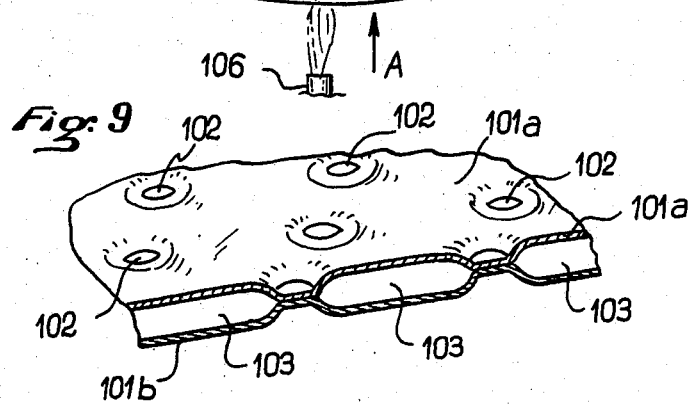
Figure 8C:
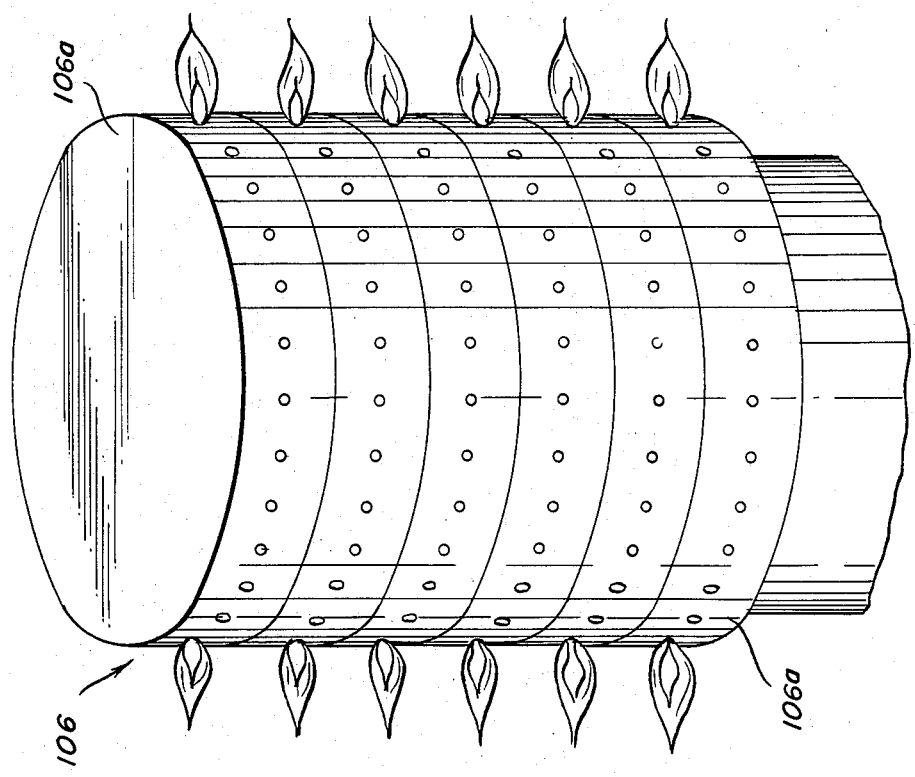
FIG. 8c is a perspective view of a preferred burner assembly.
Figure 8B:
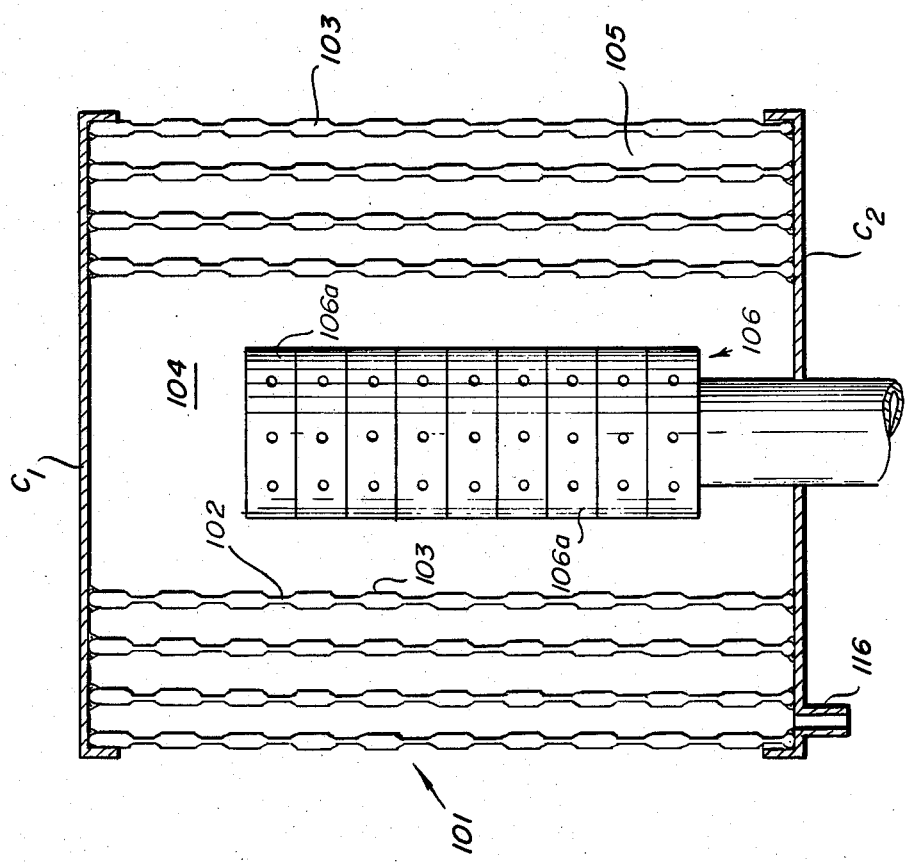
FIG. 8b is a vertical cross-sectional view of a hot fluid generator similar to that of FIG. 8a with a burner centrally arranged within a combustion chamber.

A preferred embodiment of a heat exchanger is shown in FIGS. 8a, 8b, 8c, 9, and 10. The hot fluid generator of FIG. 8a includes a hollow wall 101 having a spiral configuration of successive spaced turns arranged vertically about a central axis. As shown in FIG. 9, the wall member 101 is formed by placing two sheets 101a and 101b adjacent, spaced from, and parallel to one another and joining the sheets together at a plurality of points or deformations 101 such as by welding. The sheets have either a smooth or undulating surface, and the points of joinder are preferably formed by means of welding patterns in accordance with a programmed resistance. The top and bottom edges of the sheets are then welded together as shown in FIG. 8b and the space between the welding joints and the inner faces of the walls is adapted to receive the fluid B. Hydraulic pressure is applied between the two sheets 101a and 101b to inflate the sheets at the non-welded places as shown in FIG. 9.

In a preferred embodiment, the metal sheets 101a and 101b generally are stainless steel sheets and have a thickness of between 0.3 and 0.8 mm and preferably 0.4 mm. The space between the welding points 102 is generally between 15 and 50 mm and preferably 35 mm to allow the passage of the second fluid B through the paths 103. The number of revolutions of the wall is between 2 and 10, and preferably 4 or 5. The spacing between successive revolutions of the wall is geneally between 10 and 35 mm with the space between successive revolutions decreasing from the interior to the outer portion of the generator as shown in FIG. 8b.

By way of example, one method of forming the hollow spiral wall of the generator without compressing the two sheets 101a and 101b together is to initially fill the space between the sheets with a product such as salt and then bend the wall into a spiral configuration about the central axis, following which the salt is removed from the space within the sheets. The spiral wall thus formed includes a plurality of second spiral paths or passages 103 including baffle portions which are formed where the sheets 101a and 101b have been welded together at points 102.

A further method of obtaining a spiral hollow wall member comprises shaping the sheets after welding them together at the points 102 by exerting traction upon the sheet surfaces during the bending operation. This traction prevents the compression of the inner sheet having a smaller radius. Hydraulic pressure is then applied between the sheets to define the spacing for the paths 103 between the welding joints 102.

The hot fluid generator of FIG. 8a includes upper and lower planar lids C1, C2 which are arranged normal to the axis of the generator and which extend continuously across the upper and lower edges of the spiral wall member to close the first spiral passage 105 arranged between successive turns of the wall member. Preferably, the lids are formed integrally with the spiral wall to define a unitary structure. The wall member 101 is wound in such a manner as to define a central combustion chamber 104 within the hot fluid generator in communication with the first spiral passage. A burner 106 is centrally arranged within the generator to circulate a hot gaseous medium A through successive revolutions of the first passage 105 between portions of the wall member. The liquid B is introduced into the second passage 103 of the hollow wall 101 via the pipe 107 and exits the hot fluid generator from the pipe 108. Both fluids are circulated through the generator by suction, aspiration or blowing means, such as the suction pump 200 shown in FIG. 8a for circulating the liquid B and the blower 112 shown in FIG. 11 for circulating the fluid A.

The trajectory of the fluids A and B flowing through the hot fluid generator is in a random path due to the welding points 102 which form an obstacled or baffled trajectory for the fluid B through the inner passage 103, the welding points further forming rough spots on the external faces of the hollow wall member thereby inducing eddies in the circulation of the fluid A. The random flow of fluids A and B increases the heat exchange therebetween.

As shown in FIG. 8b, the burner 106 is arranged within the combustion chamber 104 for heating the chamber and the gaseous medium arranged thereon. Moreover, the wall surface surrounding the combustion chamber is preferably coated with black pigment so that there is better absorption of the radiation from the flame of the burner.

The preferred burner assembly is shown in FIG. 8c. This burner 106 is formed from a stack of conventional gas burner elements 106a as used in conventional stoves. The plurality of heating elements axially arranged within the combustion chamber provides a distribution of intense heat over the height of the generator. Accordingly, uniform radiation of the heat from the burner is provided over the wall defining the combustion chamber. This radiation—whose energy is proportional to the fourth power of the temperature of the burner flames—is preponderant, as regards heat exchange, with respect to the heating of the chamber wall due to convection of steam and flue gases. The heat exchange from such a device is so efficient due to the intense heating and to the shape of the generator that condensed fluids are produced in the first spiral passage 105. Accordingly, a drain tube 116 is arranged in the lower lid $C_2$ for removal of the condensed fluids from the first passage as shown in FIGS. 8b and 11.

The decreasing volume of the first spiral passage 105 in the direction from the central combustion chamber 104 toward the outer portion of the generator as shown in FIG. 8b compensates for the progressive reduction in the steam volume due to its cooling as it passes through the passage 105.

The decreasing volume of the passage also compensates for condensation of the water vapor from the steam once the dew point temperature has been reached. Accordingly, the passage 105 is designed to maintain the steam at a sufficient circulation speed throughout its course in the generator.

By way of example, a hot fluid generator may be designed from two juxtaposed steel plates each having a thickness of 0.5 mm, a height of 250 mm and a length, after winding, of 2 m. The spirally wound plates form three complete revolutions with progressive spacing—toward the center of the generator—between successive turns. The spacing is 25 mm at the output of the combustion chamber and rapidly decreased by one-half over the course of the first turn to take into account the cooling of the steam which is very rapid at the beginning. Then, the spacing is relatively constant for the next half-turn to correspond with the point at which the steam reaches its dew point. Finally, on the remaining one and one-half turns, the spacing of the first passage decreases from 12.5 mm to 10 mm to take into account the condensation of water vapor. When methane gas is burned in a burner arranged in the central combustion chamber, the generator has an output of 35 Kw.

Figure 10:
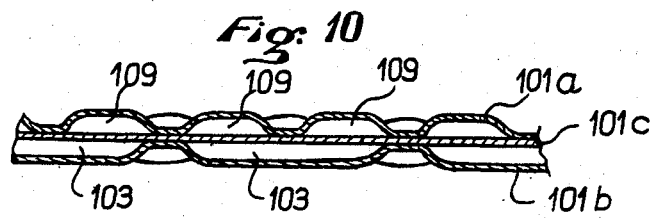

An alternate hollow wall structure is illustrated in FIG. 10 and includes first and second passageways, the second passageway 109 being formed from the addition of a third sheet 101c arranged between the first and second sheets 101a and 101b, respectively. The sheet 101a is joined to the sheet 101c at a greater number of welding points than is the sheet 101b. Thus, more passages 109 are provided between the sheets 101a and 101c than there are passages 103 between the sheets 101b and 101c. Thus, the velocity of the fluid flow is different within the passage 109 than within the passages 103. The wall structure of FIG. 10 is particularly suited for a hot fluid generator wherein it is desired to obtain, for instance, water at different temperatures.

A hot fluid generator for circulating two liquids and a gas is shown in FIG. 11. Two inlet pipes 107, 110 and two outlet pipes 108, 111 are provided, the pipes 107 and 108 communicating with the flow paths 103 and the pipes 110 and 111 communicating with the flow paths 109 as shown in FIG. 13. In the embodiment of FIG. 11, a burner (not shown) is mounted centrally within the combustion chamber. A closure wall 114 defines a chamber adjacent the outer portion of the generator. A blower 112 including a motor 113 is arranged on the outer surface of the wall 114 and communicates with the chamber via an opening 115, whereby the fluid A is drawn through the spiral chamber by the fan 112. Circulating pumps, not shown, are connected to pipes 107, 110 or 108, 111.

A portion of the gaseous fluid A condenses in the chamber adjacent the wall member 114. The fan 112 draws the condensed fluid to the bottom of the chamber for discharge through the pipe 116, as shown in FIG. 12. A pipe 117 may also be provided within the generator for directing heat from the spiral chamber to the saturating vapors entering the fan 112.

Figure 14:
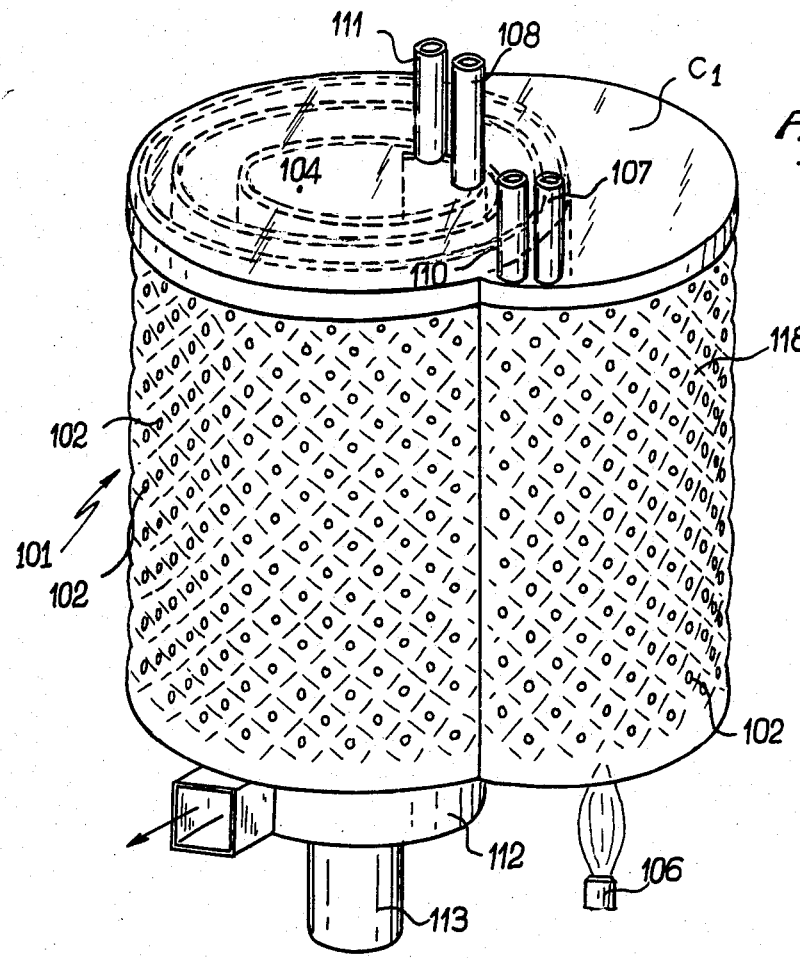
FIG. 14 is a perspective view of a fifth embodiment of the hot fluid generator.
Figure 15:
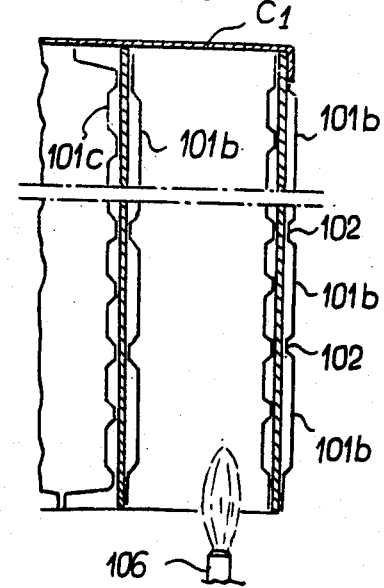
FIG. 15 is a partial sectional view of the generator of FIG. 14.
Figure 16:
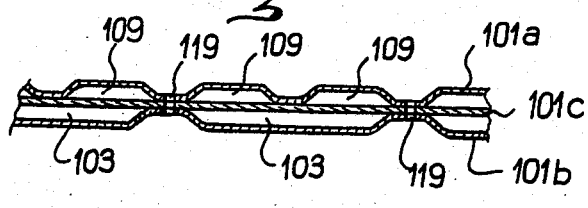
FIG. 16 is a partial sectional view of the wall member of the generator of FIG. 14.

A further embodiment of a hot fluid generator according to the present invention is shown in FIGS. 14, 15 and 16. The outer revolution of the spiral wall 101 of the exchanger is folded back on itself to define a bulge 118 which comprises a combustion chamber heated by the burner (not shown). In this embodiment, the fan 112 is mounted beneath the central region 104 of the apparatus.

The surface of the combustion chamber of this embodiment, as in the embodiment shown in FIG. 11, is preferably treated, such as by blackening, whereby the surface partially absorbs the intense radiation from the burner's flame, and to a greater extent lowers the temperature of the burner material, to increase the efficiency and lifetime of the burner.

Finally, FIG. 16 illustrates a portion of the spiral wall wherein the welding points include perforations which afford increased turbulence of the fluid A circulated through the spiral chamber in much the same manner as the channels 10a, 10b, and 10c increase the turbulence of the fluid A flowing through the hot fluid heater shown in FIG. 5.

In addition to the aforementioned embodiments, it is apparent that the spiral winding could have a variable pitch in order to optimize the heat exchange by increasing the charge loss in a manner inversely proportional to the temperature of the heated fluid. Furthermore, the spacing of the welding points may vary along the length of the wall member to gradually increase the heat exchange due to turbulence while the temperature gradient of the fluid circulating between the curves of the hollow wall diminishes. The windings of the hollow wall could also be given a conical configuration having an apex facing upwardly so that the spiral space of the hollow wall is inclined toward the horizontal in order to facilitate the condensation of fluids and the flow thereof. Finally, the generator lid members may be connected with the spiral wall member in overlapping relation as shown in FIGS. 12 and 15, or the lid members may be integrally formed with the side wall members.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. In an installation incorporating a hot liquid generator with steam condensation including a pair of spaced parallel metal sheets spirally wound with spaced turns about a vertical central axis to define hollow spiral wall means; a pair of continuous planar end closure members cooperating with opposite ends of said spiral wall means to define a first spiral passage between successive spaced turns of the wall means and a central combustion chamber communicating with said first spiral passage, said sheets being sealed together at their upper and lower ends to define a second spiral passage, and said first and second spiral passages extending continuously between said end closure members, the outer portion of said second passage being adapted for connection with a fluid inlet and the inner portion of said second passage being adapted for connection with a fluid outlet; burner means including a plurality of burner elements axially arranged within said combustion chamber for heating said chamber along the vertical dimension thereof; blower means connected with the outer portion of said first passage for drawing combustion gases from said combustion chamber through said first spiral passage; and means for removing condensed steam from said first spiral passage, the improvement wherein said installation comprises (a) suction pump means connected with the inner portion of said second passage for circulating a liquid through said second passage from the fluid inlet to the fluid outlet, said liquid being heated by heat exchange from said combustion gases through said spiral wall means;

(b) a spacing between successive turns of said spiral wall means which decreases in the direction from the inner portion toward the outer portion of said spiral wall; and (c) the surfaces of said spiral wall means defining said first passage containing a plurality of local deformations evenly distributed thereon.

2. Apparatus as defined in claim 1, wherein said local deformations are formed by crimping said pair of sheets and welding the crimped portions together.

3. Apparatus as defined in claim 1, wherein the spiral wall surface surrounding said combustion chamber includes a coating of black pigment for absorbing heat radiating from said burner means.

4. Apparatus as defined in claim 1, wherein said burner means comprises a plurality of stacked discs, the outer circumferential wall of each of said discs containing a plurality of flame outlet openings.

5. In a hot liquid generator with steam condensation including a pair of spaced parallel metal sheets spirally wound with spaced turns about a vertical central axis to define hollow spiral wall means; a pair of continuous planar end closure members cooperating with opposite ends of said spiral wall means to define a gas spiral passage between successive spaced turns of the wall means and a central combustion chamber communicating with said gas spiral passage, said sheets being sealed together at their upper and lower ends to define a liquid spiral passage therebetween and said gas and liquid spiral passages extending continuously between said end closure members; burner means including a plurality of burner elements axially arranged within said combustion chamber for heating said chamber along the vertical dimension thereof; first means for circulating combustion gases from said combustion chamber through said gas spiral passage; and means for removing condensed steam from said gas spiral passage, the improvement wherein said generator comprises (a) second means for circulating a liquid through said liquid spiral passage from the outer portion to the inner portion of said spiral wall, said liquid being heated by heat exchange from said combustion gases through said spiral wall means;

(b) a spacing between the successive turns of spiral wall means which decreases in the direction from the inner portion toward the outer portion of said spiral wall; and (c) a surface of said pair of metal sheets containing a plurality of local deformations evenly distributed thereon.

* * * * *